United States Patent
Monolo et al.

(10) Patent No.: US 6,179,944 B1
(45) Date of Patent: Jan. 30, 2001

(54) PROCESS FOR PREPARING COMPOSITE WARHEAD CASINGS AND PRODUCT

(75) Inventors: Joseph C. Monolo, Beaverdam; Fred W. Watson, Jr., Montross; George R. Evans, Woodford; John W. Hannick, King George; Robert G. Lam, Spotslvania, all of VA (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/137,419

(22) Filed: Aug. 20, 1998

Related U.S. Application Data

(60) Continuation-in-part of application No. 08/888,383, filed on Jul. 7, 1997, now Pat. No. 6,038,979, which is a division of application No. 08/721,308, filed on Sep. 30, 1996, now Defensive Publication No.H1779.

(51) Int. Cl.$^7$ ...................................................... B31C 3/16
(52) U.S. Cl. .......................... 156/169; 102/473; 102/481; 156/173; 156/175; 156/155
(58) Field of Search .................................. 102/481, 473; 156/169, 173, 175, 155

(56) References Cited

U.S. PATENT DOCUMENTS

| | | |
|---|---|---|
| 2,751,237 | 6/1956 | Conley ................................. 285/210 |
| 2,872,865 * | 2/1959 | Skaar . |
| 3,194,158 * | 7/1965 | Paul, Jr. . |
| 3,879,234 | 4/1975 | Medney ................................ 156/168 |
| 4,646,615 * | 3/1987 | Gladstone et al. ....................... 89/15 |
| 4,732,634 * | 3/1988 | Hill et al. . |
| 4,746,393 * | 5/1988 | Ephere et al. . |
| 4,781,117 | 11/1988 | Garnett et al. ........................ 102/493 |
| 4,838,166 | 6/1989 | Spies et al. ........................... 102/481 |
| 5,035,181 * | 7/1991 | Jacks et al. . |
| 5,035,182 | 7/1991 | Purcell et al. ........................ 102/481 |
| 5,060,470 * | 10/1991 | VanName . |
| 5,228,285 | 7/1993 | Van Name et al. ..................... 60/253 |
| 5,266,139 * | 11/1993 | Yokota et al. ........................ 156/169 |
| 5,311,820 * | 5/1994 | Ellingsen . |
| 5,376,200 * | 12/1994 | Hall ..................................... 156/173 |

* cited by examiner

Primary Examiner—Michael J. Carone
Assistant Examiner—Daniel J. Beitey
(74) Attorney, Agent, or Firm—James B. Bechtel, Esq.; James V. Tura, Esq.

(57) ABSTRACT

This invention is a non-fragmenting warhead casing prepared from at least one thermosetting epoxy resin and carbon fibers wherein the epoxy resin is characterized as a liquid, low viscosity resin at ambient temperatures, curable at temperatures ranging up to 175° F. and further characterized has having a glass transition temperature T(g) ranging from about 200° F. to 250° F.

10 Claims, 1 Drawing Sheet

US 6,179,944 B1

PROCESS FOR PREPARING COMPOSITE WARHEAD CASINGS AND PRODUCT

CONTINUATION APPLICATIONS

This application is a continuation-in-part of application Ser. No. 08/888,383 filed Jul. 7, 1997 U.S. Pat. No. 6,038,979 which in turn is a division of application Ser. No. 08/721,308 filed Sep. 30, 1996 now U.S. Pat. No. H001,779.

STATEMENT OF GOVERNMENT INTEREST

The invention disclosed herein may be manufactured and used by or for the Government of the United States of America for governmental purposes without the payment of any royalties thereon or therefor

FIELD OF THE INVENTION

This invention relates to ordinance devices and more particularly to thin-walled, light-weight, nonfragmenting warhead composite casings derived from thermosetting resin-impregnated carbon fibers and to the process of preparing the composite casings for use as explosive warheads and the like.

BACKGROUND OF THE INVENTION

When dealing with explosive ordnance it is important that precautions have been taken to assure that the ordinance is incapable of being accidentally exploded in high temperature environments. Warhead cook-off is the response of the explosive warhead to excessive thermal environments such as a fire or abnormally high temperatures. Cook-off is an undesirable reaction of the explosive which typically starts as a burning or deflagration process, but can continue into a detonation process if the explosive remains confined. The detonation of a warhead under such circumstances can cause severe property damage and loss of life. Thus, restricting cook-off reactions to merely burning of the warhead material will substantially improve the safety aspects of the warhead. For example, a number of prior art cook-off preventions include using casings of reinforced plastic which soften and fail on direct cook-off due to exposure to flame before the contained material attains cook-off temperature. However, this arrangement is ineffective when the casing is subjected to slow cook-off from indirect heating.

Other types of ammunition casings, formed from hardened materials, e.g. stainless steel, have met many of the needs of modern warfare, while failing to meet others. The choice of stainless steel, for example, has yielded casings which have a great deal of strength and have been able to withstand the rigors of combat. The main disadvantage of stainless steel casings, however, has been the reaction of the encased ammunition to heat. When the hardened shell has a melting point higher than the ignition temperature of the enclosed ammunition, the shell or casing contains the expanding gases created during the ammunition cook-off. When the pressure of these expanding gases is great enough, the casing ruptures generating damage and metal fragments. The prior art has addressed the problem of munition cook-off. For example, U.S. Pat. No. 4,991,513 describes means for providing vent holes in the munition casing using a mechanism to open or close the holes. U.S. Pat. No. 5,361,703 discloses a casing, which contains the charge, with an arrangement for opening the casing to vent the pressure before the casing attains a temperature where cook-off may occur. These prior technologies, however, have resulted in disadvantages such as increased weight, poor sealing of the casing, increased complexity requiring operator action to ready the munition, increased cost and various other disadvantages. In accordance with this invention, however, a carbon fiber composite munition casing is provided which has increased strength, lower weight, and lower cost, while retaining the insensitive characteristics when subjected to higher temperatures.

SUMMARY OF THE INVENTION

This invention is directed to a process of preparing thin-walled, nonfragmentary carbon composite warhead casings having increased strength, lower weight and at less cost while retaining the characteristics of a warhead capable of resisting cook-off at higher temperatures. More specifically, this invention relates to a method of preparing a thin-walled, non-fragmenting composite warhead casing which comprises impregnating a tow of carbon fibers with effective amounts of at least one liquid epoxy resin and wrapping the impregnated carbon fibers over a mandrel and maintaining the impregnated carbon fibers on the mandrel at ambient temperatures until the epoxy resin jellifies and subsequently heating the resin impregnated carbon fibers at temperatures ranging from about 125° to 175° F. until the epoxy resin cures on the carbon fibers to form the composite casing; said liquid epoxy resin characterized as having a low molecular weight and a low viscosity at ambient temperatures and a T(g) glass transition temperature ranging from about 200° F. to 250° F.

Accordingly, it is an object of this invention to provide a method of preparing a thermosetting resin-impregnated carbon fiber casing capable of losing its structural integrity at temperatures below the ignition temperature of the explosive in the casing.

It is another object of this invention to provide a thermosetting resin-impregnated carbon fiber casing for warheads having high tensile strength, comparatively low in weight and at less cost.

It is another object of this invention to provide a carbon fiber composite shell for encasing explosive material that will eliminate or minimize the likelihood of undesirable explosive reactions caused by high temperatures.

These and other objects of the invention are accomplished by the method of preparing the resin-impregnated carbon fiber casings disclosed herein.

THE PREFERRED EMBODIMENTS

Figure 1:
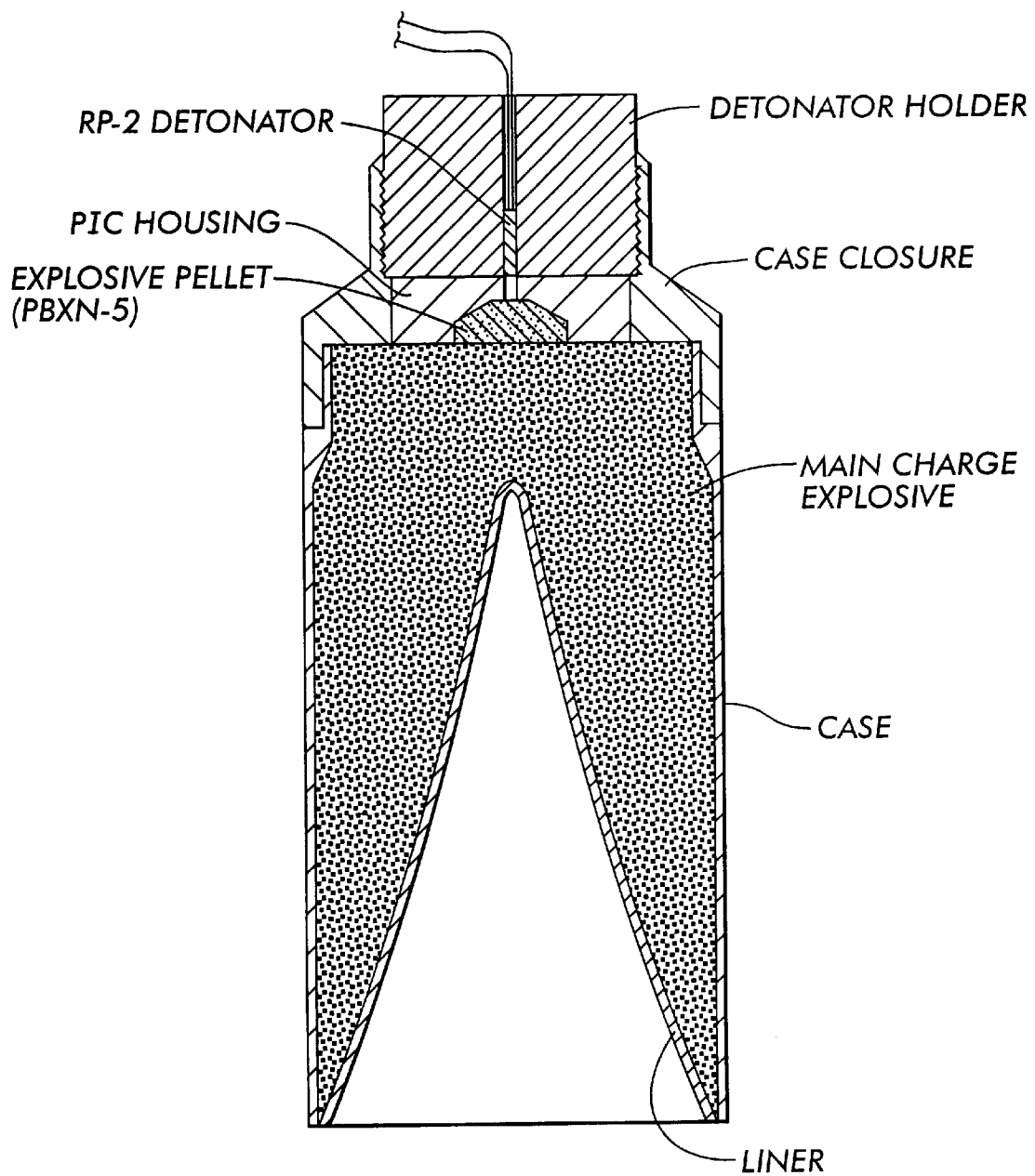
FIG. 1 is a general configuration of a SMAW-HEAA warhead casing.

This invention is directed to the method of preparing ordinance devices and more specifically thin-walled, light weight, non-fragmentary composite warhead casings derived from at least one particular class of thermosetting resins and carbon fibers. The thermosetting resins, for purposes of this invention, are the epoxy resins characterized as being liquid and low viscosity resins at ambient temperatures capable of curing with a cross-linking agent such as a polyamine at increased temperatures to form a cured carbon fiber composite useful as a warhead casing as illustrated in FIG. 1. As shown in FIG. 1, the Shoulder-launched Multi-purpose Assault Weapon (SMAW), High Explosive Anti-Armor (HEAA) warhead consist of the carbon-epoxy composite case 2 of this invention filled with an explosive 4 and a liner 5 with the initiation at the rear of the warhead. The initiation at the rear of the warhead. The initiation consist of the case closure 6 threaded onto the casing 2 and containing within the closure the explosive pellet 8, the detonator 9, the housing 10 and the detonator holder 12.

More specifically, the epoxy resins including mixtures thereof may be defined as low viscosity liquid resins at ambient temperatures which contain at least two epoxy groups wherein the epoxy groups are either terminal or internal. The polyglycidyl compounds, for example, contain a plurality of 1–2 epoxide groups derived from the reaction of a polyfunctional active hydrogen-containing compound with an excess of an epihalohydrin. When the active hydrogen compound is a polyhydric alcohol or phenol, the resulting epoxide contains glycidyl ether groups. A preferred group of polyglycidyl compounds are derived from the condensation of 2,2-bis(4-hydroxyphenyl)propane, i.e. bisphenol-A. Some of the preferred epoxy resins are available commercially under trade names "EPON 1513", EPON 8132, EPON 871, "EPON 828", "EPON 1001", and "EPON 1009" from the Shell Chemical Co. The carbon fibers for purposes of this invention are not limited, and may be selected from a number of carbon fibers used in the field. For example, carbon fibers which can be used include coal tar pitch carbon fibers, oil tar pitch carbon fibers, and carbon fibers derived from polymers such as polyacrylonitrile carbon fibers.

More specifically, for purposes of this invention, the epoxy resins maybe used alone or in solution at concentrations of 40 to 100% solids by weight. Various solvents may be used in preparing the solutions including xylene, toluene, terpenes, methyl ethyl ketone, methyl isobutyl ketone, ethyl cellosolve, butyl cellosolve, cellosolve acetate, ethyl acetate, butyl acetate, methyl isobutyl carbinol, isopropanol, n-butanol, cyclohexanone or mixtures thereof with various other solvents in any proportion. Usually, the content of the volatile components i.e. solvents in the resin solution ranges from about 5.0 to 50% e.g. 15–40% by weight of the total. A specific thermosetting epoxy resin used in combination with the carbon fibers comprises an epoxy resin characterized by the presence of at least two epoxy groups, in combination with an effective amount of a polyamine curing agent. The preferred epoxy resins must be liquid at ambient temperatures, have a low molecular weight and a low viscosity e.g. EPON-828.

The amine curing agents used to cure or crosslink the epoxy resins include the aliphatic and aromatic amines, and in particular the tertiary amines, e.g. $C_2$–$C_{30}$, and preferably $C_2$–$C_{10}$ polyamines. The preferred curing agents are the $C_2$–$C_{10}$ polyamines that contain two or more reactive hydrogen groups. Examples of the amine curing agents include triethylenetetramine, m-phenylenediamine, diethylamino-1-propylamine, ethylene diamine, m-xylylene diamine, tetraethylene pentamine, etc. Effective amounts of the amine curing agent are employed to assure substantial crosslinking of the liquid epoxy resin. An effective amount is that amount needed to cure the epoxy resins. Generally, stoichiometric amounts or a slight excess of the epoxy resin may be employed. For purposes of this invention, it is important that the epoxy resins have low viscosities, low molecular weights and be liquid at ambient temperatures. These epoxy resins cure with the amines at increased temperatures e.g. 125° F. to 175° F. The liquid epoxy resins are used to saturate or wet the carbon fibers. For example, in the composite the carbon fibers range from about 50 to 75% by weight e.g. 50 to 60% by weight and the epoxy resins range from about 50 to 25% by weight of the composite. The curing agents e.g. polyamines are present in the liquid epoxy resins in amounts ranging from about 5 to 15% e.g. 10% by weight of the epoxy resins. The resin such as EPON 828, may be used alone or as a mixture with other commercially available resins such as EPON 8132 or 871. The mixture of resins may comprise, for example, 60 to 80% by weight of EPON 828 and 20 to 40% by weight of EPON 8132 and/or 871. Generally, the polyamine curing agent is used in an amount of about 5 to 15% by weight based on the total amount of epoxy resin. While various epoxy resins together with the polyamine curing agents can be used with the carbon fibers to provide the warhead composite casings, it is essential for purposes of this invention that the glass transition temperature T(g) of the epoxy resin be below 250° F. i.e. below the ignition temperature of the explosive in the composite warhead casing.

One of the primary purposes of this invention is to provide a method for preparing composite casings to satisfy slow cook-off, bullet impact, and sympathetic detonation safety requirements in warheads without sacrificing the warhead's operation performance. It was anticipated that a reduction of warhead weight in comparison to a steel case would be a substantial improvement. Moreover, the elimination of fragments produced by a steel case will reduce or eliminate any shielding required in the packaging thereby further reducing the overall package weight.

As distinguished from the composite casing of this invention, the prior SMAW (Shoulder-launched Multipurpose Assault Weapon), HEAA (High Explosive Anti-Armor) warheads consisted of a thin stainless steel case filled with explosive with a symmetrically placed copper liner forward with initiation at the rear. The liner is trumpet shaped which is locked in place by an aluminum retaining ring. An aluminum rear closure seals the aft end of the warhead and houses the initiation booster. As a specific example, the carbon composite case was dimensioned to the full bore SMAW warhead. The fabrication of the case was a process of wet winding with a Thornel T3006K Grade 309NT carbon tow using EPON 8132 resin with 14 parts by weight of triethylenetetramine as the curing agent. The wet carbon fibers were wrapped over an aluminum mandrel in the direction and at pitches matching the internal case forward end and external aft end threads. Longitudinal wall strength was gained by using a layer of unidirectional carbon fiber sheet. A separate steel mandrel, with the internal case threads machined onto it, was fastened to the case mandrel and the overwrap produces the internal case threads. After wrapping, the wet case was rotated at room temperature until the epoxy resin jellified. This operation was performed to prevent dry fiber areas. The case was subsequently cured in an oven for 4 hours at 150 degrees F in an effort to accelerate the normal cure time for air cure resins to produce a fill resin cure. After curing, the outside case diameter and aft closure threads were machined onto the case. The composite case warhead utilizes the SMAW warhead full bore liner, liner retaining ring and standard aft closure.

To satisfy the MIL-STD 2105 cook-off criteria, the case was designed to lose structural integrity at a temperature well below the detonation temperature of the explosive allowing the explosive to vent and burn. A temperature of 225±25 degrees F was selected because the explosive with the lowest reaction temperature of those considered for shape charge warheads was Octol, with a reaction temperature of 285 degrees F. Tensile specimens were made of various resin blends and curing agents and evaluated. The object of the test was to ascertain the glass transition temperature T(g) of each composition, determined by the structural failure of the test specimen and gather data on the ambient room temperature Ultimate Tensile Strength (UTS) of each resin blend. Of the resin blends that satisfied the glass transition temperature of 225±25 degrees F those of the highest strength were evaluated for use with the composite case. Each specimen was evaluated using a Material Test System Model 810 servo-hydraulic test machine equipped with an environmental chamber for heating. A tensile load of 70 pounds was applied to the specimen. The chamber was heated to a starting temperature and then gradually elevated until the test item failed. During testing, load versus displacement and temperature versus time were plotted. The UTS tests were also conducted using a Material Test System Model 810 servo-hydraulic test machine at ambient room temperature. The load was gradually increased until tensile failure of the test item.

TABLE 1

RESINS AND CURING AGENTS TESTED IN THE DEVELOPMENT OF THE SMAW COMPOSITE CASE WARHEAD

| | Manufacturer |
|---|---|
| Resins | |
| Epon 828 | Shell Chemical Co. |
| Epon 871 | Shell Chemical Co. |
| Epon 8132 | Shell Chemical Co. |
| Vinyl Ester COR 75-168-751 | Interplastic Corp. |
| Vinyl Ester COR VE8300-35 | Interplastic Corp. |
| FMD 180/181 (UV curing) | Loctite Corp. |
| Curing Agents | |
| Triethylenetetramine (T410) | Fisher Scientific |
| Versamid 40 | Shell Chemical Co. |

TABLE 1-continued

RESINS AND CURING AGENTS TESTED IN THE DEVELOPMENT OF THE SMAW COMPOSITE CASE WARHEAD

| | Manufacturer |
|---|---|
| Versamid 25 | Shell Chemical Co. |
| B002 YSE CURE | Ajinomoto USA Inc. |
| Methyl Ethyl Ketone and Benzoil Peroxide | |

The results of the resin blends/curing agents glass transition temperature T(g) tests are provided in Table 2. The results of the tensile strength of the specimens at ambient temperature are presented in Table 3. The data ranged from 1000 to 5000 psi nominally.

Several of the resin blends/curing agents, selected from the previous tests, were evaluated in making the composite case. It was readily apparent that the Versamid curing agents were unacceptable due to viscosity and rapid jell times. Also, the Versamids were too thick at room temperature to ensure proper wetting of the carbon fibers. The most suitable compositions included triethylenetetramine (T410) as the curing agent. The low viscosity allowed proper wetting and the jel times were sufficient to allow the wrapping of four units, the optimum quantity for the curing oven. Since very few tests were conducted with T410, the strength vs temperature tests were repeated using blends of the resins EPON 8132 and Epon 828 and the curing agent. The results of these tests are shown in Table 4.

TABLE 2

Elevated Temperature Specimens
Temperature Setpoint = 250° F.
Load = 100 lbs.

| Sample ID | Formula | Diameter (in.) | Start Temp. (° F.) | Final Temp. (° F.) | Δ Temp (° F.) | Time to Failure (min., sec.) |
|---|---|---|---|---|---|---|
| 7-1 | 828 (100)/V25 (33) | 0.6105 | 78 | 185 | 107 | 5'55" |
| 7-2 | 828 (100)/V25 (33) | 0.5990 | 116 | 201 | 85 | 6'0" |
| 7-3 | 828 (100)/V25 (33) | 0.6000 | 126 | 208 | 82 | 3'55" |
| 11-1 | 828 (100)/V40 (33) | 0.6020 | 144 | 217 | 73 | 2'50" |
| 11-2 | 828 (100)/V40 (33) | 0.5970 | 150 | 221 | 71 | 2'50" |
| 11-3 | 828 (100)/V40 (33) | 0.6085 | 154 | 223 | 69 | 2'40"* |
| 12-1 | 828 (50)/871 (50)/V25 (50) | 0.5990 | 77 | 184 | 107 | 6'0" |
| 12-2 | 828 (50)/871 (50)/V25 (50) | 0.5985 | 117 | 196 | 79 | 4'10" |
| 12-3 | 828 (50)/871 (50)/V25 (50) | 0.5890 | 128 | 203 | 75 | 3'40" |
| 24-1 | 828 (200)/871 (25)/V25 (100) | 0.6250 | 80 | 206 | 126 | 8'45" |
| 24-2 | 828 (200)/871 (25)/V25 (100) | 0.6235 | 135 | 218 | 83 | 4'45" |
| 24-3 | 828 (200)/871 (25)/V25 (100) | 0.6245 | 145 | 231 | 86 | 4'46" |
| 23-1 | 828 (200)/871 (60)/T410 (28) | 0.6260 | 149 | 248 | 99 | 6'47" |
| 23-2 | 828 (200)/871 (60)/T410 (28) | 0.6255 | 168 | 250 | 82 | 5'47" |
| 23-3 | 828 (200)/871 (60)/T410 (28) | 0.6245 | 176 | 252 | 76 | 5'24" |
| 14-1 | 828 (200)/871 (100)/T410 (28) | 0.6005 | 145 | 232 | 87 | 4'20" |
| 14-2 | 828 (200)/871 (100)/T410 (28) | 0.6005 | 156 | 235 | 79 | 4'0" |
| 14-3 | 828 (200)/871 (100)/T410 (28) | 0.6020 | 161 | 242 | 81 | 3'50" |
| 10-1 | 8132 (100)/V25 (33) | 0.6025 | 143 | 224 | 81 | 3'25" |
| 10-2 | 8132 (100)/V25 (33) | 0.6020 | 150 | 227 | 77 | 3'10" |
| 10-3 | 8132 (100)/V25 (33) | 0.6000 | 141 | 221 | 80 | 3'20" |
| 19-1 | 8132 (150)/871 (50)/V40 (50) | 0.6200 | No data, premature failure at pre-existing crack | | | |
| 19-2 | 8132 (150)/871 (50)/V40 (50) | 0.6205 | 124 | 197 | 73 | 3'05" |
| 19-3 | 8132 (150)/871 (50)/V40 (50) | 0.6180 | 134 | 217 | 83 | 4'33" |
| 15-1 | 8132 (800)/871 (200)/T410 (112) | 0.5750 | 80 | 188 | 108 | 7'18" |
| 15-2 | 8132 (800)/871 (200)/T410 (112) | 0.5660 | 101 | 197 | 96 | 5'40" |
| 15-3 | 8132 (800)/871 (200)/T410 (112) | 0.5870 | 124 | 208 | 84 | 5'15" |

Notes:
828 is EPON-828
V25 is Versamide-25
V40 is Versamide-40
871 is EPON-871
8132 is EPON-8132

TABLE 3

Room Temperature Specimens

| Sample ID | Formula | Diameter (in.) | C.S. Area (in²) | Max. Load (lbs.) | UTS (psi) | Displacement (in.) |
|---|---|---|---|---|---|---|
| 7-RT | 828 (100)/V25 (33) | 0.6020 | 0.285 | 310 | 1088 | 0.005 |
| 17-RT | 828 (100)/V40 (65) | 0.5925 | 0.276 | 460 | 1667 | 0.006 |
| 12-RT | 828 (50)/871 (50)/V25 (50) | 0.6035 | 0.286 | 550 | 1923 | 0.020 |
| 13-RT | 828 (100)/871 (50)/V25 (50) | 0.6025 | 0.285 | 340 | 1193 | 0.008 |
| 23-RT | 828 (200)/871 (60)/T410 (28) | 0.6260 | 0.308 | 1375 | 4464 | 0.095 |
| 14-RT | 828 (200)/871 (100)/T410 (28) | 0.6015 | 0.284 | 1310 | 4613 | * |
| 10-RT | 8132 (100)/V25 (50) | 0.6000 | 0.283 | 535 | 1890 | 0.013 |
| 19-RT | 8132 (150)/871 (50)/V40 (50) | 0.6170 | 0.299 | 675 | 2258 | 0.035 |
| 15-RT | 8132 (800)/871 (200)/T410 (112) | 0.5580 | 0.245 | | | |
| 25-RT | Loctite UV Cureable | 0.6120 | 0.294 | 590 | 2006 | 0.010 |

*Sample did not fail

TABLE 4

Elevated Temperature Specimens
Temperature Setpoint = 250° F.
Load = 70 lbs.

| Sample ID | Formula | Diameter (in.) | Start Temp. (° F.) | Final Temp. (° F.) | Δ Temp (° F.) | Time to Failure (min., sec.) |
|---|---|---|---|---|---|---|
| C1-1 | 8132 (100)/TETA (14) | .506 | 75 | 209 | 134 | 10'35" |
| C1-2 | 8132 (100)/TETA (14) | .505 | 120 | 223 | 103 | 5'25" |
| C1-3 | 8132 (100)/TETA (14) | .505 | 138 | 227 | 89 | 4'50" |
| C2-1 | 8132 (100)/TETA (12) | .502 | 156 | 231 | 75 | 3'35" |
| C2-2 | 8132 (100)/TETA (12) | .503 | 163 | 233 | 70 | 3'50" |
| C2-3 | 8132 (100)/TETA (12) | .506 | 162 | 238 | 76 | 3'50" |
| C3-1 | 8132 (100)/TETA (10) | .502 | 163 | 226 | 63 | 3'35" |
| C3-2 | 8132 (100)/TETA (10) | .503 | 163 | 224 | 61 | 3'50" |
| C3-3 | 8132 (100)/TETA (10) | .502 | 170 | 227 | 57 | 3'50" |
| C4-1 | 8132 (50)/828 (50)/TETA (14) | .503 | 170 | 237 | 67 | 4'55" |
| C4-2 | 8132 (50)/828 (50)/TETA (14) | .502 | 170 | 245 | 75 | 4'45" |
| C4-3 | 8132 (50)/828 (50)/TETA (14) | .502 | 174 | 250 | 76 | 4'20" |
| C5-1 | 8132 (50)/828 (50)/TETA (12) | .505 | 173 | 238 | 65 | 4'20" |
| C5-2 | 8132 (50)/828 (50)/TETA (12) | .502 | 173 | 243 | 70 | 4'05" |
| C5-3 | 8132 (50)/828 (50)/TETA (12) | .505 | 177 | 246 | 69 | 3'50" |
| C6-1 | 8132 (50)/828 (50)/TETA (10) | .505 | 173 | 237 | 64 | 3'40" |
| C6-2 | 8132 (50)/828 (50)/TETA (10) | .505 | 179 | 244 | 65 | 3'35" |
| C6-3 | 8132 (50)/828 (50)/TETA (10) | .503 | 180 | 248 | 68 | 3'25" |
| C7-1 | 8132 (75)/828 (25)/TETA (14) | .507 | 153 | 231 | 78 | 5'25" |
| C7-2 | 8132 (75)/828 (25)/TETA (14) | .504 | 160 | 241 | 81 | 5'05" |
| C7-3 | 8132 (75)/828 (25)/TETA (14) | .506 | 178 | 245 | 67 | 4'25" |
| C8-1 | 8132 (75)/828 (25)/TETA (12) | .505 | 171 | 235 | 64 | 4'05" |
| C8-2 | 8132 (75)/828 (25)/TETA (12) | .505 | 178 | 243 | 65 | 4'05" |
| C8-3 | 8132 (75)/828 (25)/TETA (12) | .506 | 180 | 246 | 66 | 3'45" |
| *C9-1 | 8132 (75)/828 (25)/TETA (10) | .504 | 176 | 224 | 48 | |
| C9-2 | 8132 (75)/828 (25)/TETA (10) | .504 | 170 | 229 | 59 | |
| C10-1 | 8132 (25)/828 (75)/TETA (14) | .505 | 186 | 249 | 63 | 4'-5" |
| C10-2 | 8132 (25)/828 (75)/TETA (14) | .505 | 186 | 252 | 66 | 4'04" |
| C10-3 | 8132 (25)/828 (75)/TETA (14) | .505 | 180 | 250 | 70 | 4'10" |
| **C11-1 | 8132 (25)/828 (75)/TETA (12) | .505 | 158 | 230 | 72 | 5'10" |
| **C11-2 | 8132 (25)/828 (75)/TETA (12) | .510 | 164 | 241 | 77 | 5'40" |
| C11-3 | 8132 (25)/828 (75)/TETA (12) | .506 | 166 | 247 | 81 | 4'40" |
| C12-1 | 8132 (25)/828 (75)/TETA (10) | .505 | 244 | 244 | 56 | 3'35" |
| C12-2 | 8132 (25)/828 (75)/TETA (10) | .505 | 245 | 245 | 56 | 3'45" |
| C12-3 | 8132 (25)/828 (75)/TETA (10) | .498 | 252 | 252 | 63 | 3'50" |

*Sample broke at large pre-existing crack.
**Data questionable, load ≠ 70 lbs.

Due to operational requirements, the case threads shear strength was evaluated. During launch of the SMAW, the warhead threads are in compression. However, due to the sudden drag experienced at fin deployment, a tension load spike results across the threads. Furthermore, as the tip of the fuze probe strikes an armored target, at an angle other than normal, the resulting bending moment causes a shearing load across the threads. Tensile tests were conducted on the composite cases to gather data on the shear strength of the case threads. The fabrication process, designed into the case construction to achieve the maximum shear strength, was based on previous experience with composite structures. Cases were made using the EPON 8132 resin and T410 curing agent. Testing was conducted on an Instron tensile test machine. An aft closure and a liner retaining ring were modified for interfacing between the case and the test equipment. The samples were loaded at a displacement rate of 0.05"/minute until failure occurred. The load levels that caused thread failure are provided in Table 5. All failures resulted from the shearing of the case inner threads.

TABLE 5

TENSILE LOAD LEVELS CAUSING COMPOSITE CASE THREAD FAILURE

| Sample # | Load (Lbs) |
|---|---|
| 2 | 3360 |
| 3 | 3380 |
| 4 | 3850 |
| 5 | 3525 |

The safety tests of the composite case warheads using the explosives PBXN-5 and LX-14 consisted of slow cook-off, bullet impact and sympathetic detonation. The performance tests, comparing these two explosives, consisted of armor penetration and flash x-ray liner jet characterization. Two (2) each warheads were subjected to the slow cook-off tests in accordance with the procedures of MIL-STD-2105B. Both PBXN-5 loaded warheads and one (1) LX-14 warhead had a burning reaction. The reaction of the other LX-14 warhead was a deflagration. All reactions occurring with the average test item skin temperature in the mid to 300° F. range.

A bullet impact test was conducted with a warhead of each configuration. No reaction of the LX-14 explosive was observed. Although evidence indicates a low order deflagration type reaction occurred with the PBXN-5, there was no indication of liner jet formation. Four (4) warheads of each explosive were evaluated for armor penetration. Each warhead was positioned 9.34 inches, stand-off at detonation of the SMAW HEAA warhead under dynamic conditions, above a column of nine(9), 200 mm thick (nominal) Rolled Homogeneous Armor (RHA) plates. The warhead was oriented with its forward end down and its longitudinal axis aligned with the centerline of the column. Each warhead was conditioned at −25±5 degrees F.

In conclusion, when subjected to the slow cook-off safety tests, a burning reaction was observed with both composite cases loaded with PBXN-5 thereby passing the MIL-STD 2105 slow cook-off criteria. One of the composite cases loaded with LX-14 explosive reacted more violently than with PBXN-5 and does not satisfy the MIL-STD 2105 slow cook-off criteria. The composite case loaded with LX-14 explosive is less sensitive than PBXN-5 when subjected to bullet impact. The reaction observed (deflagration) with PBXN-5 in the composite case is less severe than the reaction observed (explosion) using the SMAW HEAA steel case. A sympathetic detonation occurred with the PBXN-5 loaded composite case warhead. The composite case provides sufficient containment to allow the formation of shaped charge jet. Furthermore, PBXN-5 explosive out performs LX-14 in penetration depth and consistency in the SMAW HEAA composite case. The jet tip velocity of the composite case warhead using PBXN-5 explosive exceeded that of LX-14 in the composite case warhead and the baseline SMAW HEAA warhead. However, the penetration depth of PBXN-5 was below that normally achieved with the SMAW HEAA warhead which meets the performance requirement of 610 mm.

In the present invention, the mandrel acts as a mold, and the exterior shape of the mandrel determines the interior shape of the resulting casing. In the preferred embodiment, dual strands with a high filament content were found to provide best results; however, the number of strands wound at once could be changed to suit the specific end product desired. The filament content determines the strength of the resulting material. For high tensile strength applications, including warhead casings, high filament content carbon fibers yield better results. The prepared carbon thread is passed through a liquid, low viscosity epoxy resin at ambient temperatures. It is important that the ignition temperature of the explosive enclosed by the composite casing exceed the glass transition temperature T(g) of the resin. In a preferred embodiment, an epoxy resin (8132) was found to yield several advantages. First, the glass transition temperature range of the resin was between 200 and 250 degrees Fahrenheit. Additionally, this resin cured at ambient temperatures e.g. about room temperature, thus minimizing the need for special curing procedures. Once the carbon fiber thread was coated or impregnated with the resin, it is tightly wound about the mandrel. The thread must be tightly wound about the mandrel in order to provide strength and the ability to hold the shape of the mandrel after the completion of the manufacturing process. In order to maintain structural integrity of the resulting casing, it is important that the fiber be wound as a continuous thread. Breaking the thread jeopardizes the integrity of the casing formed through the process. The entire process may be repeated one or more additional times to provide higher tensile strength to the resulting casing. In the preferred embodiment, three separate layers of carbon fiber were used, with the second layer longitudinally, in order to provide tensile strengths exceeding 3000 pounds.

Once the winding steps have been completed as many times as desired, the mold is allowed to cure and harden. The resulting hardened casing is removed from the mandrel yielding a finished product. Because the shape of the mandrel can be used to form all inner surfaces including making screw threads, no additional processing is required on the inner surfaces. The outer surfaces of the casing are machined if necessary, yielding a completed finished casing. This novel method of manufacture allows the manufacturing process to include the internal machining which results in more accurate internal dimensions, faster manufacturing times, and more efficient use of materials. Since the manufacturing process is faster and less complex, manufacturing costs are reduced.

A specific example of a resulting casing is a hollow cylindrical tube approximately six inches in length. The inner surface and outer surface of the casing are smooth as a result of the winding and machining process. The thickness of the wall of the casing is approximately 1.5 millimeters. Interior threads are formed during the winding process. External threads are formed by machining the resulting casing after winding. In this particular example, the preferred embodiment of the present invention, combines tensile strengths exceeding 3000 pounds with glass transition T(g) and resin breakdown temperatures under 250 degrees Fahrenheit.

While this invention has been described with a number of specific examples it is obvious that there are other variations or modifications that can be made without departing from the spirit and scope of the invention as set forth in the appending claims.

The invention claimed:

1. A method of preparing a thin-walled, non-fragmenting composite warhead casing which comprises impregnating carbon fibers with effective amounts of at least one liquid epoxy resin at ambient temperatures and wrapping the impregnated carbon fibers over a mandrel and maintaining the impregnated carbon fibers on the mandrel at ambient temperatures until the epoxy resin jellifies and subsequently heating the resin impregnated carbon fibers at temperatures ranging from about 125° to 175° F. until the epoxy resin cures on the carbon fibers to form the casing; said liquid epoxy resin having a low viscosity at ambient temperatures, a T(g) glass transition temperature ranging from about 200° F. to 250° F. and containing an effective amount of a curing agent.

2. The method of claim 1 wherein the liquid epoxy resin contains effective amounts of an amine curing agent.

3. The method of claim 2 wherein the amine curing agent is a polyamine.

4. The method of claim 3 wherein the curing agent is triethylenetetramine.

5. The method of claim 3 wherein the epoxy resin contains from about 5 to 15% by weight of the polyamine curing agent.

6. The method of claim 5 wherein the epoxy resin is a mixture of epoxy resins that cure at temperatures ranging from about 140° to 160° F. and have a glass transition temperature T(g) below about 250° F.

7. The method of claim 6 wherein the polyamine is triethylenetetramine.

8. The method of claim 1 wherein the carbon fibers are a carbon tow.

9. The nonfragmenting composite warhead casing obtained by the process of claim 1.

10. The nonfragmenting composite warhead casing obtained by the process of claim 6.

* * * * *